United States Patent [19]
Geiger

[11] Patent Number: 5,048,864
[45] Date of Patent: Sep. 17, 1991

[54] CYCLE TYPE VEHICLES

[76] Inventor: Ervin D. Geiger, 11346 Avery Rd., Palm Beach Gardens, Fla. 33410

[21] Appl. No.: 513,073

[22] Filed: Apr. 23, 1990

[51] Int. Cl.$^5$ .............................................. B60R 21/00

[52] U.S. Cl. .................................... 280/755; 280/704; 280/767; 180/209

[58] Field of Search ........................ 280/755, 707, 704; 100/209, 65.3

[56] References Cited

U.S. PATENT DOCUMENTS 3,980,150 9/1976 Gigli .................................. 280/767

FOREIGN PATENT DOCUMENTS 71420 3/1988 Japan ................................. 180/65.3
2215292 9/1989 United Kingdom ............... 180/65.3

*Primary Examiner*—Kenneth R. Rice

[57] ABSTRACT

A motor or bicycle type vehicles which has floating balance wheels so as to fit all terrain. They may be manually retracted or automatically retracted or lowered; inclosed for all-weather operations or open. An option to run on solar and wind power with retractable collectors.

3 Claims, 1 Drawing Sheet 2 4 6 7 11 9 13 1 14 15 17 20 21 19 14

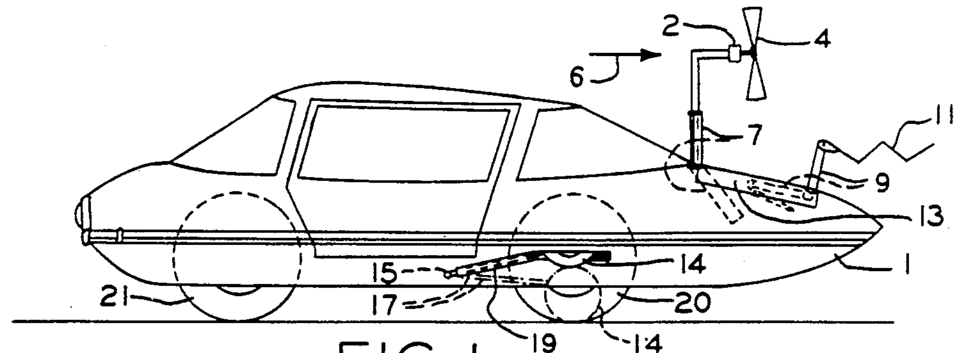
FIG_1
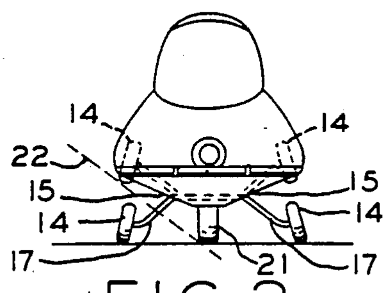
FIG_2
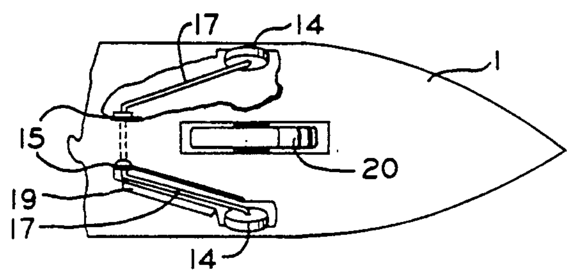
FIG_3
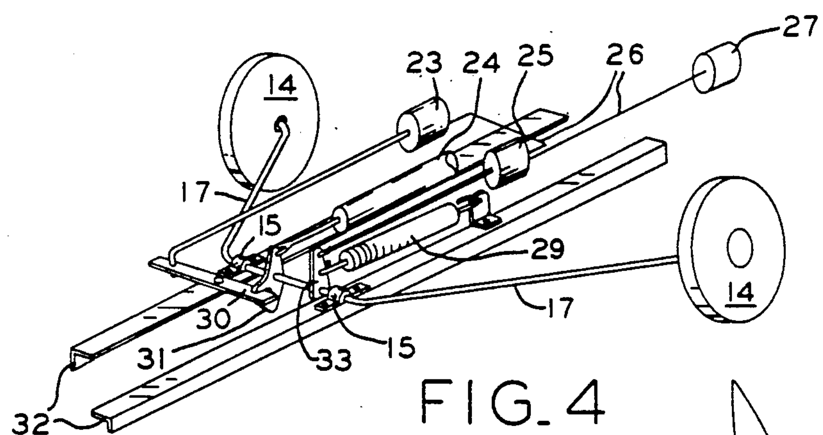
FIG_4
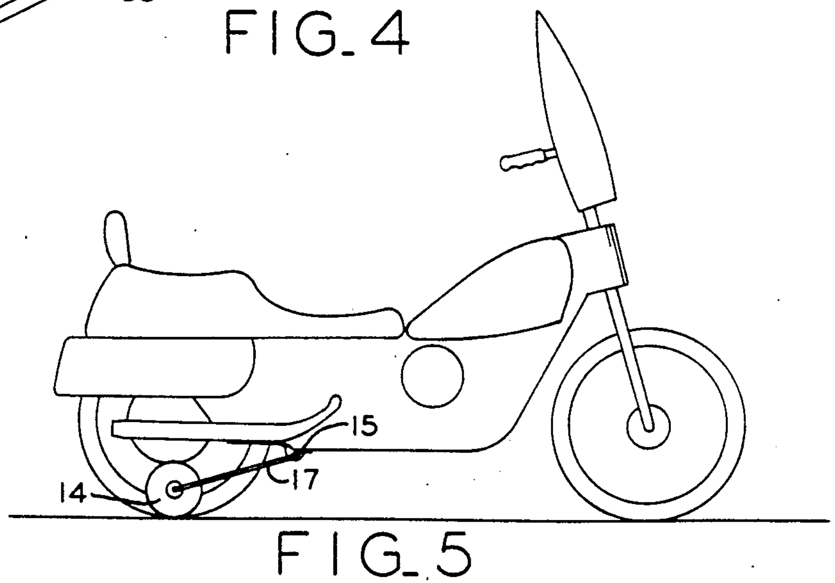
FIG_5

CYCLE TYPE VEHICLES

BACKGROUND-FIELD OF INVENTION

This invention relates to the motorcycle, scooter, and bicycle type vehicles which the operator uses his feet to balance the vehicle when in a standing position.

BACKGROUND-DESCRIPTION OF PRIOR ART

These vehicles all have an advantage, being only two wheeled vehicles; they require less energy to operate as put up less wind resistance. However, they also have a common disadvantage. They tend not to be all weather vehicles because the operators must use their feet to balance the vehicles while they are stopped. Hence they can not be inclosed to keep out he weather.

In the prior art, there has been a number of attempts to solve this problem. None have done so successfully to the point of mass production of these typė vehicles. For example; Leach, 1946, U.S. Pat. No. 2,398,541 and Sutton, 1972, U.S. Pat. No. 3,700,059. As in the rest of the prior art, they use retractable balance wheels. But notice in each case, the balance wheels struts hinge from "longitudinally" pivoting hinge. In each case the wheels are locked in position in a downward mode to balance the vehicle when it is moving slow and stopped.

However there is some disadvantages that are not, on the surface, apparent; these are some of the reasons they have not been successful:

(a) When the vehicle comes to a valley type surface with the balance wheels on the high sides of the valley, either the rear drive wheel loses traction, or the front wheel can not be properly steered as the weight of the vehicle is not fully on them. Both situations are unexceptedly.

(b) Then as the balance wheels are placed between the two main drive and steerable wheels, turning is made to be a problem. Sutton steers the balance wheel at the expense of more manufacture costs, yet solves only half of the unexceptedly problems. Also the balance wheels project out past the body and are a hazard to operation, where they can accidentally be hooked on to what ever is close to one side or the other of the vehicle.

OBJECTS AND ADVANTAGE

Accordingly, the present invention solves the above problems, yet with simplicity of structure and low manufacturing costs. These are some of the objects and advantages;

(a) to provide balance wheels for cycle type vehicles that will be effective in all types of operating surfaces, yet still maintain drive and steerable wheels traction.

(b) to provide the balance wheels within a body inclosure or provide the said wheels within the frame-work of the backward sloping struts, so as not to catch on any objects close by.

(c) to provide an all weather vehicle with less wind resistance, therefore save on fuel economy; by either providing an enclosed body vehicle or by providing component sections that can inclose present motorcycle type vehicles either partially or completely, then provide them with the balance wheel kits.

(d) to provide smaller two passenger all weather vehicle commuters for traveling back and forth to work and shopping, etc.; yet not use fossil fuel, but use sun and wind energy stored while parked at work or shopping, etc.

(e) other advantages will be discussed in the description of the drawings and there operations.

DRAWING FIGURES

FIG. 1 shows a side elevation of an enclosed cycle type vehicle, also the embodiments of the sun and wind energy collectors.

FIG. 2 shows the same vehicle in FIG. 1, only a front view showing the balance wheels retracted within the vehicle body.

FIG. 3 shows a sectional bottom view of the drivewheel and the retracting means of the balance wheels.

FIG. 4 shows the balance wheels and the apparatus for their operation.

FIG. 5 shows the kit application of the balance wheels on an existing motorcycle. Also showing that the balance wheel struts are placed on the outside of the wheels in order to shield them.

REFERENCE NUMERALS IN DRAWINGS

1 body or enclosure components
2 wind generator
4 wind propeller
6 shows the wind direction
7 is the telescoping, pivoting mask for the generator
9 is the folding mask for the solar collectors
11 is the folding solar collecting plates
13 is the folding doors for the energy package
14 is the balance wheels
15 is the hinging bearings
17 is the balancing wheels struts
19 is the folding doors for the struts
20 is the drive wheel
21 is the steerable wheel
22 shows the angle of the lean of the vehicle
23 is the retracting release means
24 is the strut speed control means
25 is the power means to retract the balance wheels
26 shows the linkage of the governor to the retracting apparatus
27 is the governor which is linked to the drive wheel speed
29 is the spring or loading means
30 shows the release means to lower the wheels
31 is the holding means
33 shows the spring and power bracket

DESCRIPTION-OPERATION

A typical body or enclosure is shown in FIG. 1. The body can be manufactured as an enclosed vehicle or enclosure kits can be manufactured in component sections with the balance wheels kit to fit different cycle type vehicles already in service.

Also in FIG. 1 the optional battery,(batteries and power packs or engines not shown), type energy recharging package is shown. The folding shaft 7, which also telescopes up and down and rotates, to keep the wind propeller 4 in line with the wind direction 6. When not in use, it folds down in the its compartment and the door 13 closes the compartment. The same is true with the solar collectors on the folding plates which are equipped with its folding arm 6. It will be noted that these collectors can also be placed on the upper surface of the rest of the body.

The retractable balance wheels 14 are shown both in their down position, dotted line, and their up position.

Also shown in FIG. 2. It will be noted that the balance wheels 14 are mounted on the U shaped struts 17. Shown also in FIGS. 3 and 4. Then unlike the prior art the struts are hinged on a transverse position, (not longitudinal), in relation to the body 1; by means of the bearings 15. The axles for the wheels 14 are then offset from the hinging means bearings 15. Therefore the wheels 14 can float, so to speak, and let the drive wheel 20 and the steerable wheel 21 always firmly on the ground.

Then when the balance wheels 14 are in their retracted position, shown in the dotted line in FIG. 2, they still project slightly so that even in their retracted position, the vehicle is still held in an operating position; note the dotted line 22. In this position, the vehicle is resting on both the drive wheel 20 and the steerable wheel 21 as it also rests on the slightly projected wheel 14. The vehicle can actually be operated in this position. Then should the retractable apparatus fail to work; one can still get in an upright position by increasing the speed of the vehicle, then turn into the direction the body is slanting; much like coming out of a curve in normal operations.

FIG. 4 shows an example of a retracting means. In this example the retracting struts 17 along with their wheels 14 are in a spring loaded 29 position. They are lowered by means of the a power means 25, such as an electric motor, air or hydraulic cylinder. The speed of their decent is controlled by means 24, such as a shock absorber. Once the wheels are down, there can still put down pressure one the wheels 14 to help balance the lighter type vehicles like bicycles. Then each time they are retracted, they are held in a retracted position by means of a latching means 30 and 31. This latching means can be manually controlled by a control means 23 or be controlled automatically by a link 26, between a power means 25 and a governor means 27, which is controlled by the speed of the drive train, so that a preset speed the wheels 14 will lower automatically. In the same way they are then retracted.

The same retracting means shown in FIG. 4, then can also be made in a kit form to fit and operate on an existing vesicle as shown in FIG. 5. Also a component type kit could be furnished to fit different vehicles to inclose them and make them all weather vehicles and look much like the vehicle in FIG. 1.

As any one in this field of art can quickly notice; there are many different adaptation available within the scope of this invention. Thus the scope of the invention should be determined by the appended claims and their legal equivalents, rather than by the examples here given.

I claim:

1. Vehicles of the bicycle or motorcycle type which may be inclosed like regular automobiles, comprising;

a vertical stabilizing means secured to said vehicle, comprising;

a transverse vertical hinging means forming a vertically retractable generally U shaped strut means extending on each lateral side of the vehicle; said strut means for securing transverse bilaterally spaced-apart wheels in a substantially longitudinally off-set position in relation to the said transverse hinging means; said off-set strut wheels being capable of mutual vertical floating action relative to the vehicle being vertically stabilized;

a vertical stabilizing means; control means;

said control means to selectively control, manually or automatically, the capacity to raise, retract at any selected position, lower to any selected position, add extra down pressure in excess of their own weight, or control at any selected vertical speeds, the off-set strut wheels.

2. The invention in claim 1 wherein selective energy collector are included, comprising;

an energy storage means to power the vehicle;

a retracting and extending apparatus attached to the vehicle; selected, folding sun energy collectors, and or wind energy collectors attached to said apparatus to collect energy while the vehicle is in a parked mode;

an apparatus control means;

said control means to selectively, either manually or automatically, control the apparatus for the extending, retracting, or of the storing of the apparatus and the attached energy collectors, inside the vehicle body while the vehicle is moving.

3. The invention is claim 1 or 2 wherein the vehicles strut wheels are retracted or extended within the width of the vehicle body so that there is no projecting hazard outside the vehicle's lateral sides.

* * * * *